Patented Mar. 13, 1951

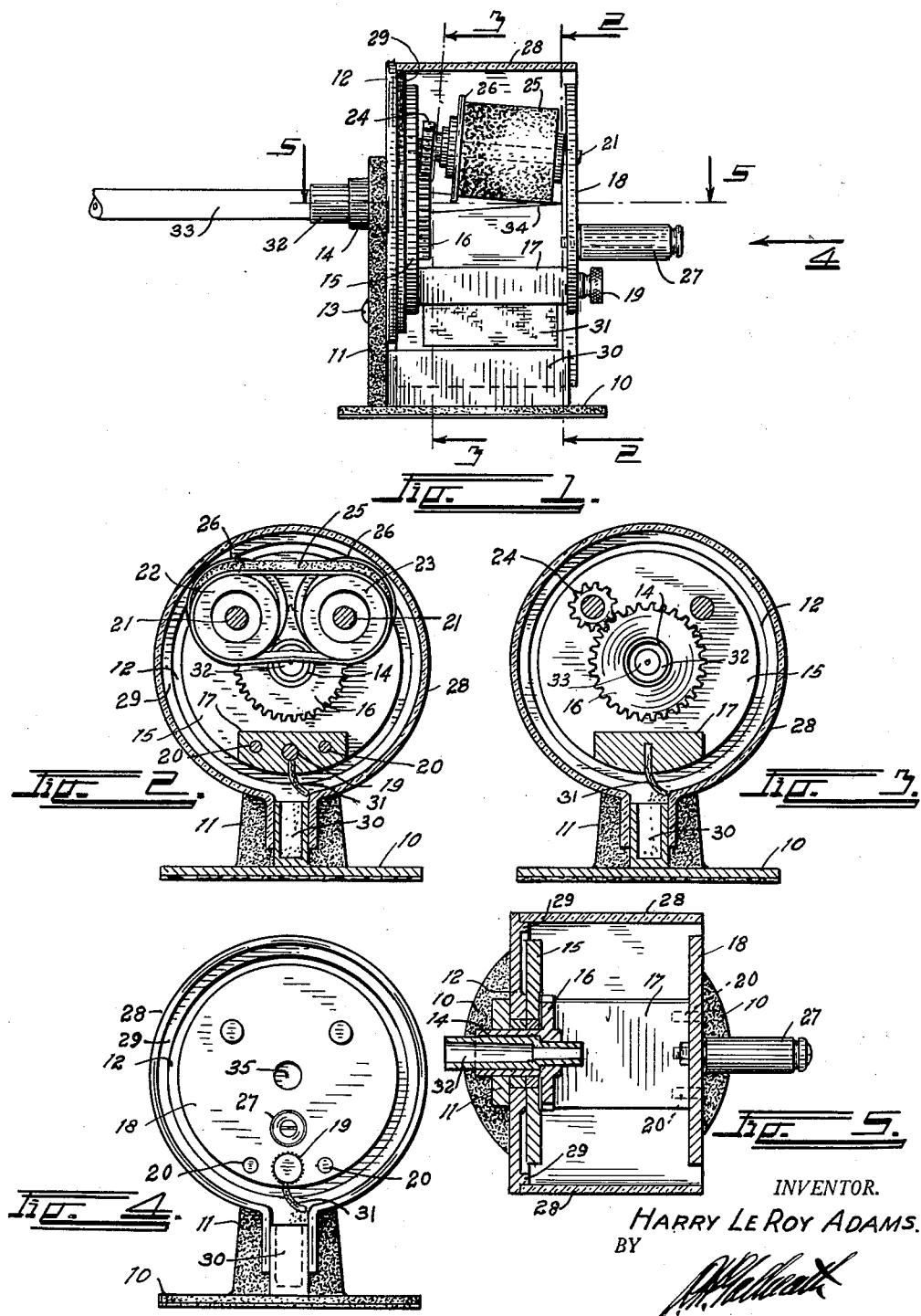

2,545,221

UNITED STATES PATENT OFFICE 2,545,221

PENCIL SHARPENER

Harry Le Roy Adams, Denver, Colo., assignor of one-tenth to Veda G. Jones

Application August 9, 1948, Serial No. 43,209

3 Claims. (Cl. 120—94)

This invention relates to a pencil sharpener, and more particularly to a sharpener for use on photo retouching pencils which require a long, sharp, tapered point on the lead.

The principal object of the invention is to provide a sharpener which will quickly, accurately and efficiently grind a pencil lead to an extremely long, sharp, tapered point without breaking the lead.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a vertical, longitudinal section, taken on the center line of the improved sharpener;

Figs. 2 and 3 are cross-sections therethrough, taken on the lines 2—2 and 3—3, respectively, Fig. 1;

Fig. 4 is an end view of the improved sharpener, looking in the direction of the arrow 4, Fig. 1; and Fig. 5 is a horizontal section, looking downwardly on the line 5—5, Fig. 1.

The improved pencil lead sharpener comprises a base plate 10 from which a supporting bracket 11 arises. A circular end member 12 is secured to the bracket 11 by means of a suitable attachment screw or rivet 13. A tubular bearing 14 is tightly forced through the end member 12 and the arm 11 at the axis of the former so as to remain stationary therewith.

A circular plate 15 is rotatably mounted on the tubular bearing 14 adjacent the inner face of the end member 12 and is held in place by means of a stationary gear 16 which is formed on or permanently mounted on the bearing 14 so as to remain stationary therewith.

A supporting arm 17 is formed on the plate 15 and extends forwardly from one side of the periphery thereof. A circular disc 18 is secured on the extremity of the arm 17 by means of an attachment screw 19. The disc 18 is maintained concentric with the plate 15 by means of dowels 20 projecting from the extremity of the member 17 into the disc 18. A finger crank 27 projects from the disc 18 eccentrically of the axis thereof.

Two inclined roller shafts 21 extend through the disc 18 and are threaded into the plate 15.

A drive roller 22 is rotatably mounted on one of the shafts 21, and a driven roller 23 is mounted on the other shaft 21. An endless abrasive belt is trained around both of the rollers 22 and 23. The belt 25 is prevented from moving inwardly by means of flanges 26 formed on the inner extremities of the two rollers. A toothed pinion 24 is mounted on the inner extremity of the drive roller 22 so as to be constantly in mesh with the teeth of the gear 16.

It is desired to call particular attention to the position of the shafts 21. When the arm 17 is at the bottom, as shown in Figs. 1, 2 and 3, the shafts 21 will lie parallel to each other and in an inclined plane, approaching the plane of the axis of the bearing 14 forwardly of the sharpener. The shafts 21 are so positioned in relation to the axis of the bearing 14 that the forward edge of the endless abrasive belt 25 will extend slightly across the projected axis of the bearing 14.

It can be seen that if the crank 27 be rotated clockwise, it will cause the rollers 22 and 23 and the arm 17 to rotate clockwise about the axis of the bearing 14. In rotating about this axis, the pinion 24 will act as a traction gear and travel around the gear 16 to rotate the drive roller 22 at relative high speed in a clockwise direction. This rotation is imparted through the belt 25 to the roller 23 and the inner reach of the belt will travel across the axis in a counterclockwise direction.

The entire mechanism is mounted in a cylindrical housing 28, preferably formed of transparent plastic. The housing 28 fits over a projecting supporting flange 29 on the circular end 12 and clamps against the sides of a dust box 30 formed on the base 10.

A wiper blade 31, of felt or similar flexible material, is mounted in a groove in the arm 17 so as to wipe against the inner wall of the housing 28 as the mechanism is rotated therein. A pencil holder 32 is slidably mounted in the bearing 14 to receive any desired pencil, such as indicated at 33.

In use, the pencil is inserted in the holder 32 so that the lead, indicated at 34, of the former will project well forward from the holder into contact with the inclined endless abrasive belt 25 between the rollers 22 and 23. The pressure of the pencil lead slightly flexes the flexible belt outwardly from the axis of the pencil as shown in Fig. 2. When the crank is rotated, the entire belt assembly will travel around the pencil lead 34 in one direction, while the surface of the abrasive belt 25 grinds against the lead at relatively high speed in the opposite direction to bring the lead to a long, smooth, uniformly tapered, sharp point. The sharpening process may be observed through the transparent housing 28.

The flying lead dust from the sharpening operation is prevented from accumulating on the housing 28 by the wiper 31, which constantly wipes the dust into the dust box 30 of the base so that the sharpening operation will be always visible.

The endless belt is preferably covered with relatively coarse abrasive adjacent the wood point of the lead to obtain both accurate and rapid grinding results.

While a specific form of the improvement has been described and illustrated herein, it is to be understood that the same may be varied, within the scope of the appended claims, without departing from the spirit of the invention.

Having thus described the invention what is claimed and desired secured by Letters Patent is:

1. A pencil sharpener comprising: a support; a tubular bearing fixedly mounted in said support and projecting therefrom; a rotary member rotatably mounted on the projecting portion of said tubular bearing; rollers rotatably mounted on said rotary member with their axes parallel to the axis of said tubular bearing; an endless abrasive belt extending between said rollers and transversally across the axis of said tubular bearing; means for rotating said rotary member; and means for imparting rotation to said rollers in consequence of the rotation of said rotary member.

2. A pencil sharpener comprising: a support; a tubular bearing fixedly mounted in said support and projecting therefrom; a rotary member rotatably mounted on the projecting portion of said tubular bearing; a shelf member projecting forwardly from said rotary member; a disc mounted on said shelf member concentric with and spaced from said rotary member; shafts extending between said rotary member and said disc; rollers mounted on said shafts; an endless abrasive belt extending about said rollers; a fixed gear mounted on said bearing; a toothed pinion mounted on one of said rollers in mesh with said fixed gear; means for rotating said disc to cause said pinion to travel about said fixed gear; means for supporting a pencil axially in said tubular bearing so that the point of the lead of said pencil will bear against said abrasive belt, said shafts lying parallel to each other and to the axis of said tubular bearing and in a plane inclined toward the projected plane of the axis to said tubular bearing.

3. A pencil lead sharpener comprising: means for supporting a pencil lead in a projecting position; a rotatable disc concentrically surrounding said latter means; a pair of rollers mounted on and projecting from said rotatable disc, said rollers being parallel to each other and both lying in a common inclined plane positioned to one side of the axis of said pencil-supporting means and inclined toward the latter axis as said rotatable disc is departed from; an endless abrasive belt trained about said rollers so as to move transversally of said lead, said inclined plane being so positioned that the mid-portion of the inner reach of said belt will incline across the point of said lead so as to be flexed outwardly by the latter; means for rotating said disc to cause said rollers and said belt to revolve about the axis of said lead; and means for revolving said rollers in consequence of their rotation about said axis.

HARRY LE ROY ADAMS.

REFERENCES CITED

The following references are of record in the file of this patent:

UNITED STATES PATENTS

| Number | Name | Date |
|---|---|---|
| 1,265,743 | Burton | May 11, 1918 |
| 1,872,476 | Loveland | Aug. 16, 1932 |
| 2,359,093 | Eastman | Sept. 26, 1944 |

FOREIGN PATENTS

| Number | Country | Date |
|---|---|---|
| 106,629 | Austria | June 10, 1927 |